R. GEER.
LAMP.
APPLICATION FILED SEPT. 8, 1919.
1,342,330. Patented June 1, 1920.
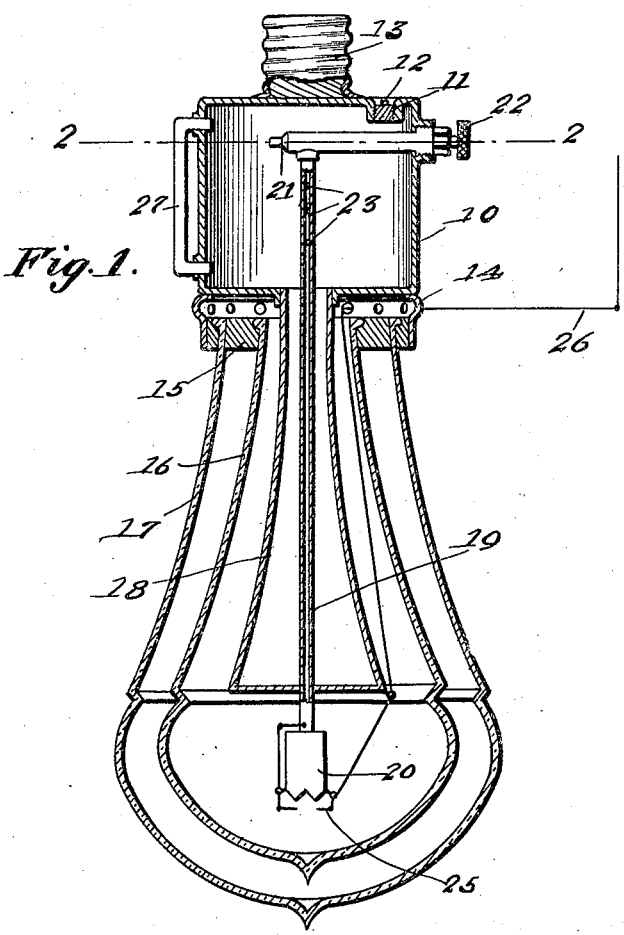
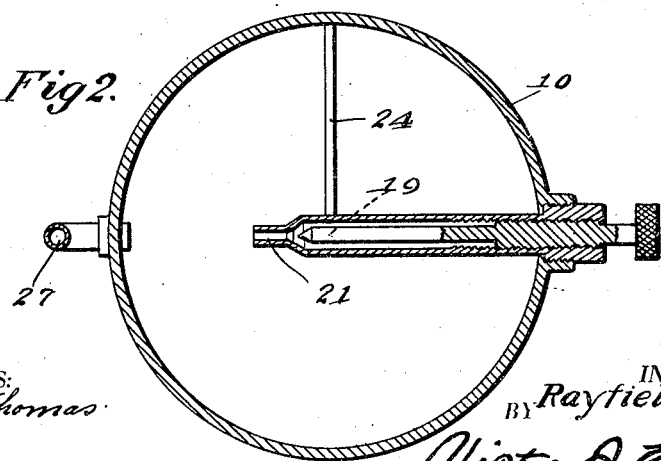
WITNESS:
R. C. Thomas
INVENTOR.
Rayfield Geer
BY
Victor J. Evans
ATTORNEY

UNITED STATES PATENT OFFICE.

RAYFIELD GEER, OF COLUMBUS, OHIO.

LAMP.

1,342,330.   Specification of Letters Patent.   Patented June 1, 1920.

Application filed September 8, 1919. Serial No. 322,573.

*To all whom it may concern:*

Be it known that I, RAYFIELD GEER, a citizen of the United States, residing at Columbus, in the county of Franklin and State of Ohio, have invented new and useful Improvements in Lamps, of which the following is a specification.

This invention relates to lamps and has for its object the provision of an acetylene lamp which carries its own carbid and water container, and is capable of use after the manner of the well known incandescent lamp, in that it may be removably fitted to a lighting fixture, the fuel from the light being carried by the lamp.

To this end the invention includes the novel formation of carbid and water container having means for regulating the flow of gas generated to the burner and means for determining the amount of water in said container.

The invention further includes the closed bulb which is carried by the container and houses the burner, means being also provided for lighting the burner by an electric spark.

The invention further includes the following novel features and details of construction to be hereinafter more fully described and illustrated in the accompanying drawings.

In the drawings:

Figure 1 is a sectional view of a lamp embodying the present invention.

Fig. 2 is a sectional view on the line 2—2 of Fig. 1.

Referring to the drawings in detail, wherein like characters of reference denote corresponding parts, the improved lamp includes a container 10, which may be of any suitable shape and size, and is provided with a filling opening 11, which is closed by a suitable cap 12. This opening is for the purpose of filling the container with a proper amount and proportions of calcium carbid and water for the generation of acetylene gas. The container 10 is provided with a centrally disposed outwardly projecting threaded member 13, for engagement with a threaded socket, such as is used upon an electrolier, or other electric fixture, enabling the lamp to be substituted for the usual electric bulb, or the fixture may be especially designed to support the said lamp.

Secured to the end of the container opposite the threaded projection 13, is a cap 14, which is preferably formed of brass, and this cap is preferably filled with a hardened substance, such as plaster-Paris or cement, as indicated at 15. Secured within the filling 15, is a pair of bulbs 16 and 17, the former being arranged within the latter. Depending from the container 10 and communicating with the latter is an extension 18, through which projects a pipe 19, which carries at its lower end a burner 20. This pipe is adapted to convey the gas generated within the container to the burner, the gas entering the pipe or port 21, which is regulated by a needle valve 22. Air is admitted to the pipe, so as to force the gas downwardly to the burner and to provide proper combustion through inlet ports 23, which are formed in the container 10 and communicate with the pipe 19, through short pipe sections 24. A suitable electric light device 25 is carried by the burner for the purpose of creating a spark, current being furnished through the medium of a conductor 26. The container 10 is provided with a sight glass 27 for determining the condition of its contents.

The invention as shown and described provides an exceedingly cheap and brilliant light, which may be easily and quickly removed from and secured to a fixture for use after the manner of the ordinary incandescent electric light.

The invention is susceptible of various changes in its form, proportions and minor details of construction and the right is herein reserved to make such changes as properly fall within the scope of the appended claims.

Having described the invention, what is claimed is:

1. An acetylene lamp comprising in combination a tank having a filling opening therein, a globe carried thereby, a burner positioned within said globe and connected to and communicating with the interior of the tank, a needle valve for controlling the supply of gas to the burner, and a threaded extension carried by the tank for removable engagement with the socket of a fixture or support.

2. An acetylene lamp comprising a tank having a filling opening therein, a closed globe carried thereby, a pipe extending within the globe, a burner carried by said pipe, air supply pipes connecting the tank and the first mentioned pipe and communicating with the atmosphere, whereby air may be admitted to the burner and a needle valve for controlling the supply of gas to the burner.

In testimony whereof I affix my signature.

RAYFIELD GEER.